Sept. 1, 1959  J. F. BACHMANN  2,902,649
OSCILLATOR STABILITY CHECKER
Filed Feb. 7, 1955

INVENTOR.
JOHN F. BACHMANN
BY
Killman and Kerst
ATTORNEYS

United States Patent Office 2,902,649
Patented Sept. 1, 1959

2,902,649

OSCILLATOR STABILITY CHECKER

John F. Bachmann, Baltimore, Md., assignor to Bendix Aviation Corporation, Towson, Md., a corporation of Delaware Application February 7, 1955, Serial No. 486,529

2 Claims. (Cl. 324—82)

This invention relates to means for checking the stability of extremely stable oscillators. Oscillators of this type are, for example, required in the transmitter and receiver of radar systems equipped for moving target identification. In one form of such systems target echo pulses are mixed in the receiver with a reference signal synchronized with the frequency of the transmitted radar pulses. The output of the receiver is thus a series of pulses, the amplitudes of which vary as a function of the phase relationship of the reflected pulses as compared to the reference wave. Each output pulse is now inverted, delayed for a time equal to the interval between transmitted pulses and compared with the next succeeding receiver output pulse. Pulses returned from fixed targets will be cancelled in this process, while those returned from moving targets will result in a residue of signal of cyclically varying amplitude.

In order to secure a high cancellation ratio in moving target indication (MTI) systems it is necessary to have extremely stable oscillators in the transmitter and receiver. Instabilities in these oscillators will prevent utilization of the high cancellation ratio built into the cancellation unit because of the moving target components added to fixed target responses by these instabilities.

Ordinarily, an oscillator is checked for stability by beating it against an oscillator of known stability or by using a discriminator circuit. The instabilities measured constitute frequency modulation of the continuous wave oscillator. In MTI work, however, the absolute frequency deviation is not, in itself, important as long as the bandwidth of the transmitter and receiver components is not exceeded. It is, rather, the variation in the amount of frequency or phase modulation which occurs in any two successive pulse intervals that is important.

It is an object of the invention to provide a circuit which will measure the frequency modulation present in a continuous wave oscillator in terms of its effect on MTI operation; that is, will not respond to frequency modulation, the modulation frequency of which is equal to $n$ PRF and will be most sensitive to frequency modulation having a modulation frequency equal to $(2n+1)$ PRF/2, where $n$ is any whole number and PRF refers to the pulse repetition frequency of the radar system.

This and other objects and advantages of the invention are realized by a circuit in which the output from the oscillator being tested is applied to two parallel branch circuits in one of which a limiting amplifier and in the other of which is a series arrangement of limiting amplifier, a delay line providing a delay of 1/PRF of the radar set and a second limiting amplifier. The outputs of these branches are applied to a phase detector.

Figure 1:
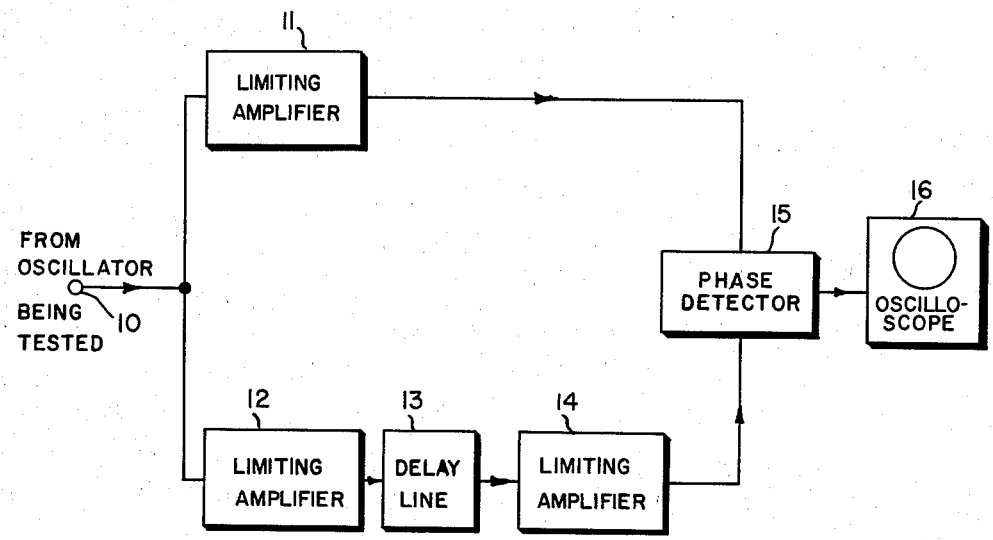
Fig. 1 is a block schematic diagram of a circuit embodying the invention.

Referring more particularly to the drawing the output from the oscillator being tested is applied to the circuit of Fig. 1 from a terminal 10. The circuit comprises a pair of branches in a parallel relationship with the terminal 10. One branch consists of a limiting amplifier 11 and the other of a limiting amplifier 12, a delay line 13 and another limiting amplifier 14, all in series.

The outputs of the two branches are applied to a phase detector 15, the output of which is fed to an oscilloscope 16.

The frequency at which the circuit elements 11, 12, 13, 14 and 15 operate is not important, although it is usually limited by the delay line 13 which is available. The line 13 should have the same amount of delay as the system for which the oscillator being checked is intended, which is to say that the delay should be equal to 1/PRF of the radar set. If the oscillator being tested operates at some frequency other than the test equipment frequency, its output must first be mixed with the output of a suitable crystal controlled stable oscillator so that the resulting beat is at the test equipment frequency.

Figure 2:
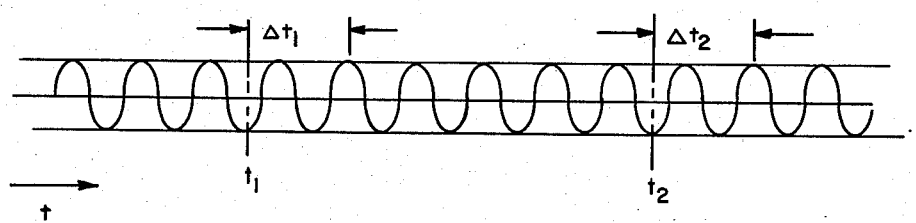
Fig. 2 is a graph showing a representation of the output of the oscillator being tested with certain time relationships indicated.

In the operation of the circuit of Fig. 1, when the phase detector 15 receives an undelayed signal through amplifier 11 at a time represented by the time $t_2$ on the graph of Fig. 2, the phase detector is also receiving a delayed signal as indicated at $t_1$, through the branch containing the delay line 13. The amplitude and polarity of the output of the phase detector will depend on the relative phase of the two signals. At some time $\Delta t$ later the undelayed input to the phase detector will be that at $t_2+\Delta t_2$ and the delayed input will be that at $t_1+\Delta t_1$. If the change in phase or frequency in time $\Delta t_2$ is any different than the change in phase or frequency that occurred in time $\Delta t_1$ the phase detector will show this difference. It is this difference between changes occurring in times $\Delta t_2$ and $\Delta t_1$ that is important in MTI operation and not the magnitude of the change in either interval $\Delta t_1$ or $\Delta t_2$ alone.

By using a delay line and beating the oscillator against itself in the phase detector the need for the critical tuning which would be required to zero beat the oscillator against a stable crystal-controlled source for comparison in the phase detector is eliminated. There are also eliminated those frequency and phase shift components which will not affect MTI operation.

If the sweep of the oscilloscope is equal to 1/PRF (equal to the amount of delay in the delay line) the deviation of the scope trace from a true horizontal line will be a measure of the difference in frequency or phase change between any two pulse intervals (2/PRF).

What is claimed is:

1. Means for checking the stability of an oscillator the normal use of which requires its modulation to provide an output of regularly spaced pulses of energy, comprising; a phase detector, a signal translating circuit having a pair of parallel branches terminating at the input of said phase detector, means applying the unmodulated output of said oscillator to said branches, one of said branches translating signals applied thereto without delay, means in the other of said branches operative to delay signals applied thereto by an interval equal to the intervals between said pulses, a cathode ray oscilloscope, means repetitively sweeping the beam of said oscilloscope along a first rectangular coordinate with a sweep duration equal to one of said intervals and means moving said beam along the other of said rectangular coordinates in accordance with the sense and magnitude of the output of said phase detector.

2. Means for comparing the amounts of phase or frequency modulation occurring in the output of an oscillator in successive equal intervals of time having a duration encompassing a plurality of cycles of said output, said means comprising: a phase detector, means forming a first conductive path between said oscillator and said phase detector, said first path impressing upon the input of said phase detector amplifier but undelayed signals impressed upon said path by said oscillator, means constituting a second conductive path between said oscillator and said phase detector, the last named means comprising a delay means operable upon the output of said oscillator as applied thereto to delay it by a period of time equal to the duration of one of said intervals, a cathode ray oscilloscope, means repetitively sweeping the beam of said oscilloscope along a first rectangular coordinate with a sweep duration equal to one of said intervals and means moving said beam along the other of said rectangular coordinates in accordance with the sense and magnitude of the output of said phase detector.

References Cited in the file of this patent

UNITED STATES PATENTS 2,434,914     Earp _____ Jan. 27, 1948

FOREIGN PATENTS 583,794     Great Britain _____ Dec. 31, 1946

OTHER REFERENCES

"Design of Frequency Deviation Detector for 400 Cycles," U.S. Naval E.E.S. Report, 6QX 1603, dated June 23, 1950, pages 2 and 3, plates 1 and 4.